United States Patent [19]
Brodnyan et al.

[11] 4,061,822
[45] Dec. 6, 1977

[54] CRUSHED FOAM COATED LEATHER AND LEATHER-LIKE MATERIALS

[75] Inventors: John G. Brodnyan, Langhorne, Pa.; Donald F. Holloway, Milwaukee, Wis.; Stanley Le Sota, Horsham, Pa.

[73] Assignee: Rohm and Haas Company, Philadelphia, Pa.

[21] Appl. No.: 585,146

[22] Filed: June 9, 1975

Related U.S. Application Data

[63] Continuation-in-part of Ser. No. 410,837, Oct. 29, 1973, abandoned, which is a continuation-in-part of Ser. No. 123,871, March 12, 1971, abandoned.

[51] Int. Cl.$^2$ .......................... B32B 3/26; B05D 5/00
[52] U.S. Cl. ..................... 428/315; 427/271; 427/277; 427/278; 427/373; 427/379; 427/384; 428/159; 428/332; 428/334; 428/335; 428/473; 428/904
[58] Field of Search ............... 428/159, 473, 904, 332, 428/334, 335, 310, 315; 427/245, 246, 271, 277, 278, 373, 264, 270, 274, 262, 355, 359, 379, 384; 69/21; 264/34, 284, 134; 156/79

[56] References Cited

U.S. PATENT DOCUMENTS

| 2,572,470 | 10/1951 | Gordon | 428/167 |
|---|---|---|---|
| 3,196,030 | 7/1965 | Petry | 427/264 |
| 3,281,258 | 10/1966 | Callahan | 428/156 |
| 3,296,009 | 1/1967 | Schütte | 427/278 |
| 3,486,920 | 12/1969 | Sington | 156/219 |
| 3,518,153 | 6/1970 | Slosberg et al. | 156/219 |
| 3,527,654 | 9/1970 | Jones et al. | 428/81 |
| 3,607,341 | 9/1971 | Goins et al. | 264/48 |
| 3,649,325 | 3/1972 | Affeldt | 264/47 |
| 3,919,451 | 11/1975 | Levy et al. | 428/473 |

FOREIGN PATENT DOCUMENTS 1,205,964   9/1970   United Kingdom.

Primary Examiner—George F. Lesmes
Assistant Examiner—Stanley S. Silverman

[57] ABSTRACT

Crushed foam coated leather and leather-like materials characterized by excellent foam adherence, are prepared by flowing foamed compounded polymeric latices into contact with a leather or leather-like substrate and partially drying same, followed by compressive crushing of the dried foam, plating or embossing to achieve optimum adhesion, and further heating and curing to develop maximum physical properties.

12 Claims, No Drawings

CRUSHED FOAM COATED LEATHER AND LEATHER-LIKE MATERIALS

BACKGROUND OF THE INVENTION

This is a continuation-in-part of U.S. Pat. application Ser. No. 410,837 filed Oct. 29, 1973, now abandoned which in turn is a continuation-in-part of Ser. No. 123,871 filed Mar. 12, 1971, now abandoned.

The present invention relates to crushed foam coated leather and leather substitutes useful in any area natural leather is employed; for example, shoes, purses garments, belts, upholstery, wallets and the like. In another aspect, it relates to a crushed foam coating on such materials and methods of accomplishing same.

Present techniques for the coating of leather and leather substitutes leave much to be desired, often involving as many as 5 to 6 coatings in order to achieve a tough, abrasion resistant topcoat on leathers of poorer quality. Even after coating, there still may be surface reflecting imperfections in the substrate.

Thus, in the art of finishing leather and leather substitutes, means for upgrading low grade materials is still being sought after. Also, much sought after is an attractive low cost alternative to the microporous urethane laminate presently used to surface the nonwoven base web of poromeric materials, such as Corfam.

Textile fabrics have been successfully coated with foamed polymeric compositions or foamable polymeric compositions which foam on the textile (U.S. Pat. No. 3,527,654). This procedure has not been successfully adapted to the nonwoven substrates, such as the leather finishing arts, because the balance of properties required for leather and leather-substitutes is different and more difficult to achieve than with conventional textile fabrics.

We have found that the properties of the crushed foam coated grain side leather and leather splits, when prepared according to the teachings of this invention, are better than those obtained with conventional systems. For example, the present techniques involve but a single coating and the thus-coated substrates are not stiffened by the coating. Also, such techniques may be used in a continuous production line. This invention eliminates many of the operations presently being employed in standard leather finishing methods.

One advantage of the present invention is that it provides crushed foam coated leather and leather-like materials rivaling natural leather. Also, this invention provides a more economical process for upgrading leather substrates.

Another advantage of this method is to mask many of the natural defects in the leather substrate. Still another advantage is to provide a controlled build up of the coating which results in lack of "photographing" of the underlying web.

SUMMARY

Broadly, the crushed foam coated leather and leather substitutes are prepared as follows:

A. foaming a compounded polymeric latex with a foam generator;

B. coating the foam on the leather or leather substitute at a thickness in the range of from 5 mils to about 60 mils;

C. partially drying the foam coating on the leather or leather substitutes at a temperature in the range of from about 120° F. to about 400° F. and, preferably, at a temperature in the range of from 125° F. to 300° F.; and simultaneously or separately:

D. crushing the partially dried foam coating at a pressure in the range of from 1 to about 50 psi; and E. embossing and curing the crushed foam coated leather or leather substitutes to achieve optimum adhesion of the crushed foam coating to the substrate at a pressure in the range of from about 50 to 2000 psi at a temperature in the range of from 100° to about 200° F.

Thus, in accordance with the present invention, a leather or leather substitute, such as a substrate suitable for making a poromeric or other leather substitutes, has a crushed foam material securely adhered thereto. The term "leather substitute", is as defined in U.S. Pat. Nos. 3,537,883; 3,100,721 and 3,000,757.

DETAILED DESCRIPTION

The latex compositions that produce the foams used in the present invention contain a copolymer prepared from the following groups of monomers:

i. 20-90% of butyl acrylate, 2-ethylhexyl acrylate, ethylene or any mixtures thereof;

ii. 40-95% of ethyl acrylate, vinyl chloride or any mixtures thereof;

iii. 20-50% of methyl methacrylate, acrylonitrile, styrene, vinylidene chloride or any mixtures thereof;

iv. 10-30% of methyl acrylate, butyl methacrylate, vinyl acetate or any mixtures thereof;

v. 0.1-5% of acrylic acid, itaconic acid, methacrylic acid or any mixtures thereof; and vi. 3-7% of hydroxyethyl methacrylate, methylol acrylamide, acrylamide, methylol methacrylamide or acrolein, or any mixtures thereof.

The copolymer may be prepared from any combination of the foregoing monomers provided that the sum thereof is 100%. It is not required that a monomer from each of the groups be present but the copolymers preferably contain at least one monomer from group vi to facilitate cross-linking. If more than one monomer is selected from any one group, such mixture must nevertheless not be outside the % range for that group of monomers.

Especially preferred are copolymers having the following compositions: 80 butyl acrylate/15 acrylonitrile/2 itaconic acid/3 methylol acrylamide; 66 butyl acrylate/30 methyl methacrylate/2 acrylic acid/2 acrolein; 95 ethyl acrylate/1.5 acrylic acid/3.5 methylol methacrylamide; 40 butyl acrylate/33 ethyl acrylate/20 methyl acrylate/2 itaconic acid/5 hydroxyethyl methacrylate; 86 ethyl acrylate/10 acrylonitrile/2.7 methylol acrylamide/1.3 acrylamide; 96 ethyl acrylate/3.5 acrylamide/0.5 acrylic acid.

The polymeric latices preferably are compounded with an aminoplast cross-linking agent prior to foaming. Such reagents include water soluble formaldehyde condensates with urea, melamine or N,N'-ethyleneurea. The aminoplast is used in an amount of about 1-10% by weight based on the copolymer solids of the latex. A preferred resin is a melamine-formaldehyde resin-forming precondensate, preferably used in an amount of about 3-5% by weight on copolymer solids. Certain of the copolymers will be self-crosslinking without the aminoplast, such as copolymers containing acrolein. The cross-linking helps to reduce tack and thereby eliminates or minimizes "blocking"–the sticking together of folds of foam-coated substrates. Therefore, cross-linking particularly by addition of the aminoplast, is preferred in the foamed polymeric emulsions of the invention.

A crushed foam coating means a coating which, after obtaining a cellular structure, is compressed by crushing or embossing. It is essential in the preparation of the crushed foam coated leather and leather substitutes that the embossed products possess a sharp and well-defined underlying pattern which is essential in yielding the leather-like surface and aesthetics required by the industry. This requires that after the system is crushed there will be minimal bounce back of the foam so that there will be substantially no loss of pattern definition. In a similar vein, if a smooth plate is used, a smooth appearance should be obtained. The crushed foam has a thickness in the range from about 3 mils to 25 mils with the preferred range being from about 5 mils to about 20 mils.

In the sequence of steps, it is necessary to conduct Steps (A) and (B) separately; however, it is possible to provide for various combinations of the subsequent crushing, embossing and final curing steps.

It is possible to crush and emboss in substantially one operation, i.e., to combine Steps (D) and (E) under suitable heat and pressure.

When a leather substitute is employed, postcuring after embossing and drying may be necessary to yield a product with improved physical performance in comparison to a product which is not postcured. This postcuring step completes many crosslinking reactions both in the foam and substrate itself. This postcuring is conducted at a temperature in the range of from 150° to about 500° F.

Regarding the maximum pressures that the substrate itself will tolerate:

On leather splits, for example, trials have been conducted up to 40 to 50 tons ram pressure, which is the equivalent of about one-thousand lbs./sq.in. On poromeric materials, however, or other types of leather substitutes, such high pressures are not required to achieve the embossing. Preferably, one would increase temperature rather than pressure to achieve satisfactory crushing and curing.

With material such as leather, splits or grain leathers, normally the preference here is for higher pressures such as 500 to 2000 psi, and preferably 500 to 1200 psi.

The pressure and temperatures that would be used on a commerical basis will depend on what the skilled artisan determines as providing a proper visual and textural effect for the system, in addition to ensuring satisfactory adhesion.

The pressures and temperatures will vary, depending upon the nature of the substrate, the smoothness of its surface, and further depending upon the inherent degree of adhesion of the crushed foam coating to different types of substrates. For example, with different types of leather, the optimum conditions will depend upon the manner of tanning. Different temperature and pressure combinations will be required to obtain adequate adhesion for a particular substrate.

Thus, we have set forth the optimum conditions for preparing a crushed foam coated leather and leather substitute. It can be seen how the various combinations of these steps can be put together by varying temperature and pressure to accomplish an acceptable product for a given type of substrate.

For example, where engaged in coating a web for a poromeric base, one could crush, emboss and cure in one operation, by applying a pressure in the range from 5 to 500 psi at a temperature in the range of from 175° to 350° F. With low crushing pressures it is desirable to operate at a temperature in the range of from about 300° to 350° F. to ensure adequate deformation of the web, if the web is bound by a polymer-like material, which itself is cured to some extent. These ranges apply to synthetic substrates, for the most part. Thus, in the range of 300° to 350° F., with a pressure in the range of 50 to 1000 psi, it is possible to crush the foam, emboss in the pattern and cure in one operation.

One can accomplish the same objective with a leather material by utilizing a pressure in the range of from 500 to 1200 psi, at a temperature in the range of from 175° to 300° F., whereby this would in substantially one operation, cause crushing, embossing and curing.

One can crush at room temperature, with minimal pressure, so as to place the substrate in a form that it can be handled. Then it goes through a combined embossing and curing step in one operation, but utilizing conditions similar to that just described for the crushing, embossing and curing sequence.

For embossing, the plate is either smooth, or grained, or can be textured to any of the various prints available for leather finishing.

It is possible to crush, separately from the embossing and curing steps, with almost any of the substrates of interest. One can crush and emboss in one operation with all the substrates, but with the poromerics, it is usual that curing occurs in the same operation. In the case of leathers, one can crush and emboss at low enough temperatures so as to require a subsequent curing step.

In Table I there is set forth a typical formulation for the foams that are useful in the coating of a nonwoven web used as a base for a poromeric material, side leather, and split leather.

TABLE I

| Formulation | Nonwoven Web and Side Leather (parts by wt.) | Split Leather (parts by wt.) |
|---|---|---|
| Latices A or B | 100.0 | 100.0 |
| China Clay | 15.0 | 15.0 |
| Ammonium Stearate 33% (Foam Stabilizer) | 7.0 | 7.0 |
| Aerotex MW melamine/HCHO Condensate (Amer. Cyanamid Co.) | 2.3 | 2.3 |
| Ammonium Hydroxide 28% | 2.0 | 2.0 |
| Colorants: | | |
| PRIMAL® Black 110 | | 15.0 |
| 85 Pts. PRIMAL® White / 10 Pts. PRIMAL® Ochre / 5 Pts. PRIMAL® D. Brown } Beige in Mixture | 15.0 | |
| TOTALS | 141.3 | 141.3 |

PRIMAL® is a registered trademark of the Rohm and Haas Company for a series of various pigments in a vehicle of a water soluble polymer binder, a sulfonated tallow, an auxiliary dispersant and water.

The formulations were foam-coated on various substrates, including a (1) nonwoven web (Corfam) from Fleming-Joffe Company, (2) PRIMAL ®571 — Impregnated Griess-Pfleger Combotan leather, (3) chrome tanned work shoe splits from Lannom Mfg. Co., (4) vegetable tanned splits, and (5) Hartland's chrome tanned splits.

The following copolymers were in the latices of the formulations (the monomer amounts are in parts by weight):

Latex A: 86 ethyl acrylate/10 acrylonitrile/2.7 methylol acrylamide/1.3 acrylamide Latex B: 96 ethyl acrylate/3.5 acrylamide/0.5 acrylic acid The formulations were partially cured and niprolled (crushed) smooth and then nip-rolled (crushed) over Warren's morocco-grained release paper to achieve a texture. After final curing, one set was topcoated with a vinyl urethane lacquer while another set was left without a topcoat.

By substituting the following latices for Latex A or B similar formulations and coated substrates may be obtained: 80 butyl acrylate/15 acrylonitrile/2 itaconic acid/3 methylol acrylamide; 66 butyl acrylate/30 methyl methacrylate/2 acrylic acid/2 acrolein; 95 ethyl acrylate/1.5 acrylic acid/3.5 methylol methacrylamide; 40 butyl acrylate/33 ethyl acrylate/20 methyl acrylate/2 itaconic acid/5 hydroxyethyl methacrylate.

The following physical tests were run on the foregoing crushed foam-coated substrates: Taber abrasion, Mul-Tech wet soak resistance, Satra Dome, Bally Flex, and Cold Crack (−20° C.) flexibility. Certain of the results are described immediately below and the data is summarized in Table II.

1. CORFAM WEB — The Latex B-containing crushed foam-coated nonwoven web, nip-rolled smooth, and topcoated with a vinyl urethane lacquer had a good balance of properties and met commercial requirements.

| Typical Commercial Requirements | Crushed Foam Coating Results |
| --- | --- |
| Good Wet Bally Flex adhesion | >40,000 Wet Bally Flexes |
| Good Wet Bally Flex flexibility | >40,000 Wet Bally Flexes |
| Cold Crack Resistance at −20° C. | No cracking at −28.9° C. |
| Embossibility | Good |
| Receptivity to Topcoats | Good |

In addition, this system was passed over 1000 cycles on the Tabor Abraser without wear. It passed 750 cycles on the Mul-Tech, and passed the Satra Dome Test.

2. CORRECTED GRAIN SIDE LEATHER — The Latex B-containing foam coating, nip-rolled smooth (crushed) on Griess-Pfleger's corrected grain side leather with PRIMAL 571 impregnated and topped with a vinyl urethane lacquer resulted in a good balance of properties. Results (following) are better than usually obtained with a conventional coating system:

| | Crushed Foam Coating Results |
| --- | --- |
| Mul-Tech Wet Soak Resistance | 430 Cycles |
| Taber Abrasion Resistance | >1000 Cycles |
| Cold Crack Flexibility | Slight Cracking |
| Appearance | Smooth and Well-filled |
| Coverage | Excellent |

4. SPLIT LEATHER — The Latex A-containing foam coating nip-rolled smooth (crushed) on a reverse side of a vegetable split also had a good balance of properties. Results (following) are better than usually obtained with a conventional coating system:

| | Crushed Foam Coating Results |
| --- | --- |
| Appearance | Smooth and well filled |
| Coverage | Excellent |
| Taber Abrasion Resistance | 600 Cycles |
| Mul-Tech Wet Soak Resistance | 270 Cycles |
| Bally Flex Flexibility (Wet) | Slight cracking |

Table II presents the physical measurements made on a number of typical substrates which had been crushed foam-coated, according to the present invention, and demonstrates the significant results obtained.

Based on the data in Table II, certain meaningful comments are possible.

In general: The Latex A-containing foam coating resulted in good wet soak resistance and abrasion resistance, but poor Bally Flex and Cold Crack flexibility. The opposite is true with the Latex B-containing foam coatings. On the nonwoven web and side leather substrates, the best balance of properties is obtained with the Latex B-containing coating, nip-rolled smooth, and topcoated with lacquer. This system results in good Taber abrasion resistance, the best Bally Flex and Cold Crack flexibility. The Mul-Tech wet soak resistance is not as good as its Latex A counterpart, but is the best of the Latex B foam coatings.

Topcoat: The Latex B formulation combined with the vinyl urethane lacquer topcoat considerably upgraded the wet soak resistance, Taber abrasion, and in some cases, flexibility.

Surface Texture: Some of the physical parameters appear to have been affected by the surface texture (smooth or embossed). With a Latex A-containing coating, the smooth-coated, untopped Corfam web shows less cold cracking than its embossed counterpart. The Mul-Tech wet soak resistance of the embossed and untopped Latex A-containing coating was better than its smooth-coated counterpart; however, the reverse was true when it was topcoated.

Wet-soak Resistance: With the Latex B-containing coating, both the smooth and embossed untopped nonwoven web had equally poor Mul-Tech wet soak resistance, while the smooth topcoated nonwoven web had much better wet soak resistance than its embossed counterpart. The other substrates were all nip-rolled smooth.

Substrates: The nonwoven web is the easiest to foam coat as it is available in a continuous roll of uniform thickness. The impregnated side leathers give some mechanical handling problems because of low spots in the leather. Certain splits are more difficult to foam-coat, because the coating does not adhere to the loose "fuzz" on a heavily sueded surface. However, a vegetable tanned split which was foam coated with the Latex A-containing coating on a smoother surface and then topcoated, resulted in good abrasion resistance, respectable wet soak resistance, and wet Bally Flex flexibility, but to be foam coated, splits will have to be free of dust or "fuzz" to obtain adequate adhesion.

EXAMPLE II

Split leather was foam-coated with a composition containing Latex A, the coating was partially dried, and crushed at less than 5 psi and at room temperature. One piece was embossed at a pressure of 550 psi and a temperature of 200° F., and was subsequently cured at a temperature of 325° F. Another piece was embossed at a pressure of 1000 psi and a temperature of 200° F., and subsequently cured at a temperature of 325° F. Both sections were then topcoated with conventional side leather finishing materials.

The adhesion of the foam coating to the substrate for the low pressure embossed was inadequate, while the adhesion of the foam coating embossed at the higher pressure was adequate.

A third section was first cured at 325° F., and then embossed at a pressure of 1000 psi and a temperature of 200° F. The adhesion of the foam coating to the substrate for this process was also inadequate. The trial demonstrates that the sequence of operation described and the conditions of pressure and temperature set forth are necessary to achieve the desired end results.

TABLE II

Physicals of Representative Acrylic Crushed Foam-Coated Substrates

| Substrate | Latex Used in Foam | Topcoat | Surface Texture | Taber Abrasion[1] Initial Failure Cycles | % Wear at 1000 cycles | Mul-Tech Wet Soak Resistance[2] Initial Failure Cycles | Cycles at 10% Failure | % Damage at/Cycles | Wet Bally Flex Amount of Failure | Cracking Amount Cracking |
|---|---|---|---|---|---|---|---|---|---|---|
| Non-Woven Web | L-A | None | Smooth | 215 | 70 | 30 | 40 | 100/100 | Moderate | Moderate |
| Non-Woven Web | L-A | Lacquer | Smooth |  | None | >10,000[6] | >10,000[6] | None/10,000[6] | Moderate | Consid. |
| Non-Woven Web | L-A | None | Embossed | 185 | 20 | 110 | 200 | 10/200 | Moderate | Consid. |
| Non-Woven Web | L-A | Lacquer | Embossed |  | None | 300 | >1,000 | >10/1000 | Moderate | Consid. |
| Non-Woven Web | L-B | None | Smooth | 165 | 100 at 550 cycles | 20 | 23 | 100/50 | Slight | Very Slight |
| Non-Woven Web | L-B | Lacquer | Smooth |  | None | 750 | 800 | 100/1000 | Very Slight | None |
| Non-Woven Web | L-B | None | Embossed | 120 | 100 at 350 cycles | 15 | 20 | 100/50 | Slight | Very Slight |
| Non-Woven Web | L-B | Lacquer | Embossed |  | None | 65 | 80 | 15/100 | Very Slight | None |
| Impregnated Side Leather | L-A | None | Smooth |  | None | 170 | 200 | 10/200 | None | Consid. |
| Impregnated Side Leather | L-A | Lacquer | Smooth |  | None | >1,000 | >1,000 | None/1000 | None | Consid. |
| Impregnated Side Leather | L-B | None | Smooth |  | None | 35 | 40 | 90/100 | None | None |
| Impregnated Side Leather Reverse Side | L-B | Lacquer | Smooth |  | None | 430 | 450 | 90/500 | Blister[4] | Slight |
| Vegetable Split | L-A | None | Smooth | 300 | 40 | 40 | 60 | 50/100 | Consid. | Consid. |
| Vegetable Split | L-A | Lacquer | Smooth | 600 | 15 | 270 | 285 | 40/300 | Slight | Consid. |

[1]Taber Abrasion: Wheel No. CS-17; Suction 60; 1000 g. Load.
[2]Mul-Tech: ½ hour soak; 4 lb. Load.
[3]Bally Flex: ½ hour soak; rated at 40,000 cycles.
[4]Blister: There was one large blister on this sample.
[5]Cold Crack: −20° F.; samples conditioned ¾ hour.
[6]This was the only sample tested for this many cycles.
Note:
All the above foam-coated substrates passed the Satra Dome Test.

EXAMPLE III

A piece of a nonwoven web coated with a foam coating composition, containing Latex B, was partially dried at 225° F., crushed with minimal pressure, subsequently topcoated with a urethane lacquer, and cured at 300° F. Another section was smooth embossed at a pressure of 10 psi and a temperature of 350° F. prior to topcoating.

The foam coating of the former section showed inadequate adhesion to the web, while the foam coating embossed according to the second sequence, showed adequate adhesion.

This trial further demonstrates the need for adequate pressure, combined with a temperature during embosssing, to achieve the desired end result, including the critical good adhesion of the crushed foam coat.

What is claimed is:

1. A method for preparing crushed foam coated leather and leather substitutes which comprises:
   A. Foaming a latex composition prepared from monomers of the following groups:
      i. 20–90% by weight of butyl acrylate, 2-ethylhexyl acrylate or ethylene;
      ii. 40–95% by weight of ethyl acrylate or vinyl chloride;
      iii. 20–50% by weight of methyl methacrylate, acrylonitrile, styrene or vinylidene chloride;
      iv. 10–30% by weight of methyl acrylate or butyl methacrylate;
      v. 0.1–5% by weight of acrylic acid, itaconic acid or methacrylic acid; and
      vi. 3–7% by weight of hydroxyethyl methacrylate, methylol acrylamide, acrylamide, methylol methacrylamide or acrolein, or any mixtures thereof; the sum of i–vi being 100%;
   B. Coating the foam on a leather or leather substitute at a thickness in the range of from 5 to 60 mils;
   C. Partially drying the foam at a temperature in the range of from 120° to 400° F. but short of curing the foam; and simultaneously or separately:
   D. Crushing the partially dried foam coating to a thickness of about 3–25 mils and such that the crushed foam coating has minimal bounce back and good pattern definition upon embossment;
   E. Embossing and curing the crushed foam coated leather or leather substitute at a pressure in the range of from about 50 to 2,000 psi at a temperature in the range of from 100° to 350° F.

2. The method of claim 1 wherein, prior to foaming, the latex composition is compounded with 1-10% by weight based on the copolymer, of an aminoplast resin, and the copolymer contains at least one monomer of group vi.

3. The method of claim 1 wherein Step E is carried out upon leather substitutes by employing a pressure in the range of from 50 to 1000 psi at a temperature in the range from about 300° to about 350° F.

4. The method of claim 1 wherein Step E is carried out upon leather by employing pressures in the range of from 500 to 1200 psi at a temperature in the range of from about 175° to about 300° F.

5. The method of claim 1 wherein the crushing step (D) is effected before embossing and curing, at a pressure in the range of from 1 to 50 psi at room temperature.

6. The method of claim 5 which comprises the additional step of postcuring at a temperature in the range of from about 150° to about 500° F.

7. The method of claim 1 wherein the copolymer contains at least one monomer of group vi.

8. The method of claim 1 wherein the crushed foam has a thickness of about 5-20 mils.

9. A leather or leather substitute which has a crushed foam coating of a latex composition containing a copolymer prepared from monomers of the following groups:

i. 20-90% by weight of butyl acrylate, 2-ethylhexyl acrylate or ethylene;
ii. 40-95% by weight of ethyl acrylate or vinyl chloride;
iii. 20-50% by weight of methyl methacrylate, acrylonitrile, styrene or vinylidene chloride;
iv. 10-30% by weight of methyl acrylate, butyl methacrylate;
v. 0.1-5% by weight of acrylic acid, itaconic acid or methacrylic acid; and
vi. 3-7% by weight of hydroxyethyl methacrylate, methylol acrylamide, acrylamide, methylol methacrylamide or acrolein, or any mixtures thereof; the sum of i-vi being 100%;

said crushed foam coating having a thickness of about 3-25 mils, minimal bounce back and good pattern definition upon embossment.

10. The crushed foam coated leather or leather substitute of claim 9 wherein the latex composition is compounded with 1-10% by weight based on the copolymer, of an aminoplast resin, and the copolymer contains at least one monomer of group vi.

11. The crushed foam coated leather or leather substitute of claim 9 wherein the copolymer contains at least one monomer of group vi.

12. The crushed foam coated leather or leather substitute of claim 9 wherein the crushed foam has a thickness in the range of from 5 mils to 20 mils.

* * * * *